UNITED STATES PATENT OFFICE.

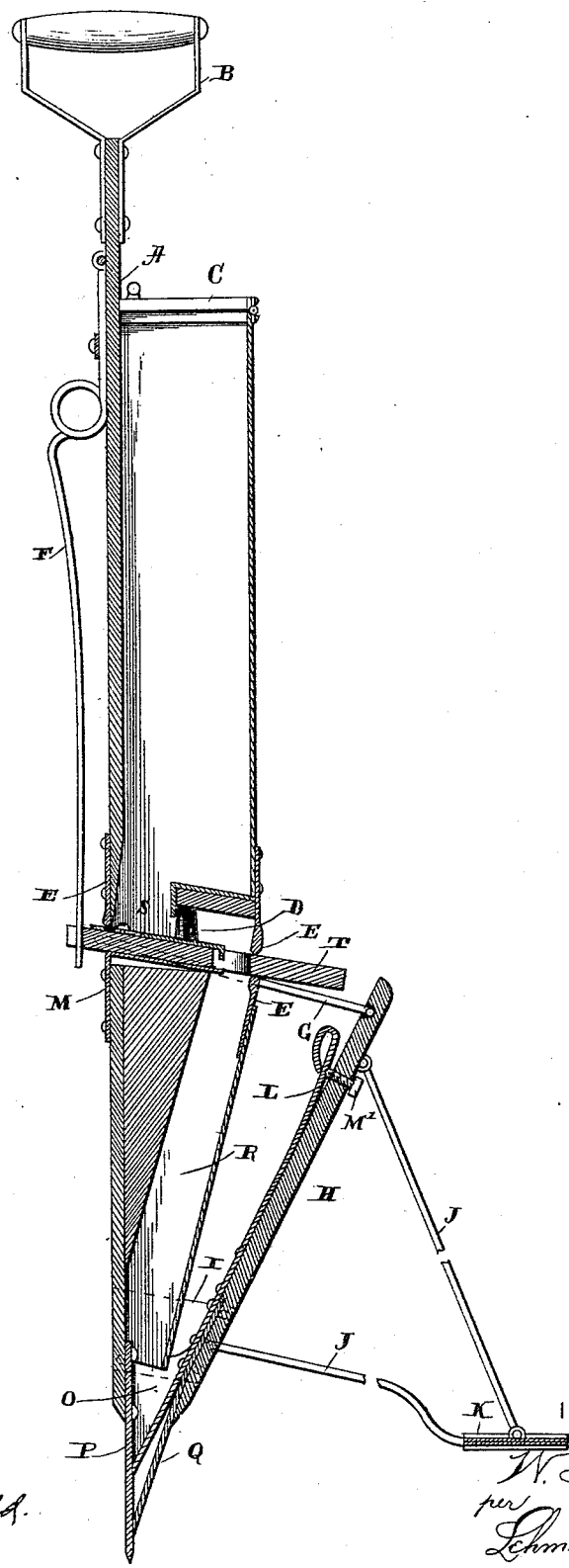

WALLACE FISK, OF MORGANVILLE, NEW YORK.

HAND-PLANTER.

SPECIFICATION forming part of Letters Patent No. 458,449, dated August 25, 1891.

Application filed May 16, 1891. Serial No. 393,032. (No model.)

*To all whom it may concern:*

Be it known that I, WALLACE FISK, of Morganville, in the county of Genesee and State of New York, have invented certain new and useful Improvements in Hand-Planters; and I do hereby declare the following to be a full, clear, and exact description of the invention, such as will enable others skilled in the art to which it pertains to make and use it, reference being had to the accompanying drawing, which forms part of this specification.

My invention relates to an improvement in hand-planters; and it consists in the combination and arrangement of parts, which will be more fully described hereinafter, whereby a cheap, simple, and automatically-acting hand-planter is produced.

The object of my invention is to provide a hand-planter for planting corn or other such seeds in hills and in which the seed-slide is operated by simply inclining the planter as the operator walks forward without stopping.

The accompanying drawing is a vertical section of a planter which embodies my invention.

A represents the board or strip to the upper end of which the handle B is secured and to which the seed-box C is rigidly fastened in the usual manner. This seed-box is provided with a hinged cover c at its top, and has placed in its bottom above the seed-slide the brush D for preventing more than the regulated amount of seed being dropped.

Upon the top of the seed-slide T is secured the slotted adjusting-plate S, which regulates the amount of seed to be dropped in each hill, and secured to the front and rear sides of the planter are the three plates E, between which the seed-slide plays freely back and forth. A fourth plate M is secured to the rear side of the planter and is bent in the form of a letter L, and the upper end of this plate extends inwardly into the body of the planter, so as to form a support upon which the slide bears and moves back and forth. Applied to the rear end of the seed-slide is a suitable spring F, by means of which the slide is returned to its normal position after having been moved, and also fastened to the rear end of the slide is the coupling-link G, which connects the slide with the upper end of the lever H for the purpose of operating the slide each time that it is inclined toward the lever. The outer end of this link simply catches in a recess formed in the upper end of the lever H, but is not fastened thereto.

The lever H is pivoted to the lower end of the board A by means of the plates I, and secured to the outer side of the lever H by the two braces J is the foot K, which, by striking against the top of the ground, forces the upper end of the lever backward each time that the planter is inclined toward the foot for the purpose of operating the seed-slide.

Secured to the inner side of the lever H is a spring-plate L, which has its movement regulated by the set-screw M', which passes through the upper end of the lever H and bears against its inner side. This spring acts as a buffer, and by striking against the inclined front side of the planter checks and brings the movement of the lever and seed-slide to an end. To the inner side of the lower end of the lever H is fastened the bent plate O, which, by catching against the plate P, secured to the lower end of the strip A, forms a cup to hold the seed until the lever H is again operated by the foot. Also secured to the lower end of the lever H is a second opening-plate Q, which, as the lower end of the lever is moved, serves to open the ground sufficiently to allow the earth to receive the seed. Each time that the seed-slide is operated the seed are dropped through the chamber R in the lower portion of the planter into the cup, where they remain until the lever H is again operated.

As will be seen, the spring F is fastened to the strip or standard A near its upper end in any suitable manner, and its lower end bears directly against the seed-slide. The coupling-link being connected to the rear end of the seed-slide, a direct push is exerted upon it each time that the lever is operated, and hence the slide is made to operate with less friction where dirty seed are used and the planter is used by a careless operator than is the case where these parts are connected and made to operate in the usual manner.

Having thus described my invention, I claim—

1. In a hand seed-planter, the strip A, having a handle secured to its upper end and an opening-plate to its lower one, combined with the spring which is fastened to its rear side, the seed-slide which is returned to position by the spring, the coupling-link connected to the seed-slide, the lever H, the foot secured to the lever, the spring L, and a set-screw for regulating the movement of the spring, substantially as shown.

2. The seed-slide, combined with the three plates E and the L-shaped plate M, substantially as described.

3. The strip A, having an opening-plate secured to its lower end, the lever H, having a plate secured to the inner side of its lower end and which is bent so as to form a box to catch the falling seed, an opening-plate secured to the lower end of the lever, and the plates by means of which the lever is pivoted to the lower end of the strip A, substantially as set forth.

4. In a hand-planter, a strip A, having a transverse opening, a slide which passes through the said opening and has one end projecting beyond the outer side of the strip, a spring which engages the said slide, a lever H, having a foot, and a link which has one end engaging the said lever, then passed around the strip A, and connected with the opposite end of the said slide beyond the outer side of the said strip, the parts combined substantially as described.

In testimony whereof I affix my signature in presence of two witnesses.

WALLACE FISK.

Witnesses:
WILLIAM RADLEY,
J. B. HEWITT.